Figure 1:
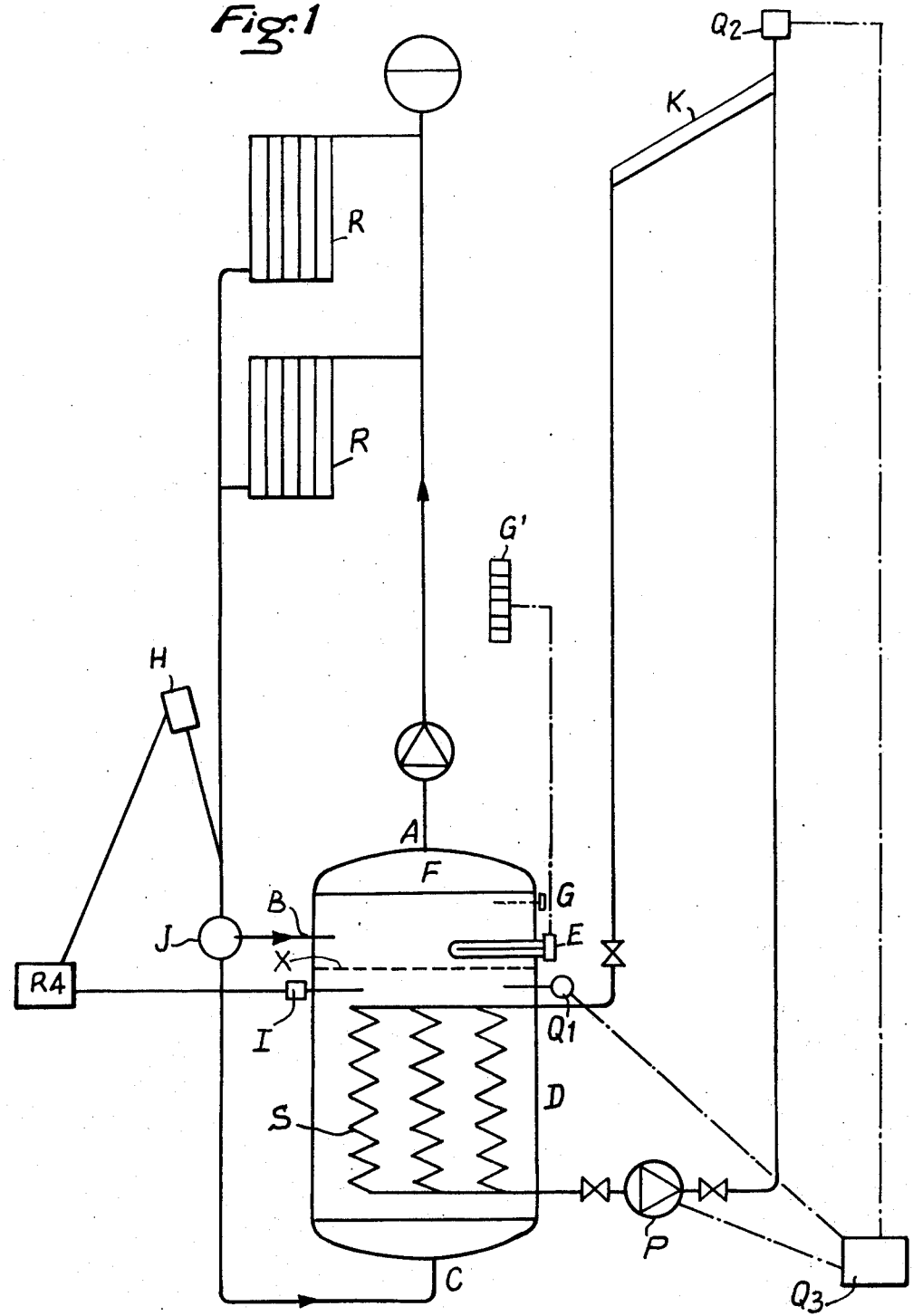

United States Patent [19]

Madern

[11] 4,037,785

[45] July 26, 1977

[54] COMBINATION SOLAR AND ELECTRIC HEATER

[76] Inventor: Jean-Pierre Madern, Route de Perpignan, 66330 Cabestany, France

[21] Appl. No.: 605,291

[22] Filed: Aug. 18, 1975

[30] Foreign Application Priority Data

Aug. 20, 1974 France .................................. 74.28915
Feb. 3, 1975 France .................................. 75.03789

[51] Int. Cl.² ................................................ F24J 3/02
[52] U.S. Cl. ..................................... 237/1 A; 126/400; 219/279
[58] Field of Search ....................... 126/271, 400, 362; 237/1 A; 219/279

[56] References Cited

U.S. PATENT DOCUMENTS

| 243,680 | 7/1881 | Austin | 126/362 |
| 2,051,240 | 8/1936 | Berryman | 219/279 |
| 3,249,303 | 5/1966 | Townsend | 219/279 X |
| 3,931,806 | 1/1976 | Hayes | 126/400 |

Primary Examiner—William E. Wayner
Assistant Examiner—William E. Tapolcai, Jr.
Attorney, Agent, or Firm—Brisebois & Kruger

[57] ABSTRACT

Heater comprises a container divided into upper and lower chambers by a perforated plate. The container is connected to receive heated liquid from a solar collector and deliver it to radiators or the like. The container is equipped with an electrical heating coil for further heating the liquid when the solar heat supply is inadequate.

5 Claims, 2 Drawing Figures

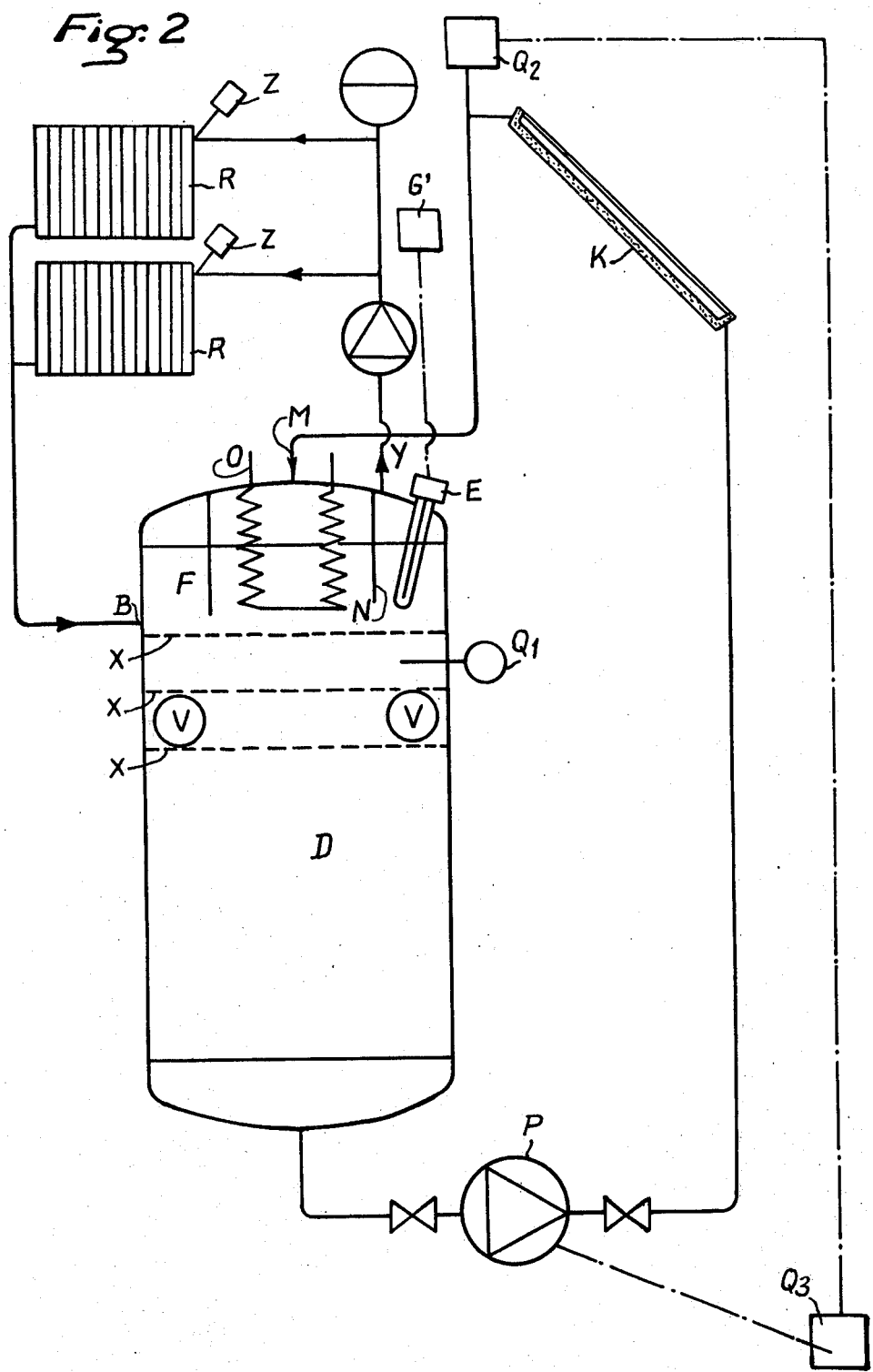

COMBINATION SOLAR AND ELECTRIC HEATER

SUMMARY OF THE INVENTION

Since solar energy is a temporary energy which is variable in intensity, it is necessary to resort to a supplemental conventional source of energy, such as electrical energy, in order to supplement the supply received from any solar source.

The use of solar energy for central hot water heating through radiators presents difficulties in securing sufficiently high storage temperatures which are sufficiently constant to permanently supply the heating needs.

Even when, in a central heating system, the water may be used at sufficiently low temperatures, of the order of 40° to 50° C, solar energy does not permit such temperatures to be permanently maintained, especially in the case of diffused light.

It is the object of the present invention to provide a device making it possible to combine in the same heater the use of solar energy and electrical energy, the use of the latter being initiated automatically by an electronic regulator connected to a thermostat responsive to the ambient temperature, without interrupting the device for accumulating solar calories.

This type of heater is designed to be used in a central heating system including radiators and for supplying clean hot water.

The heater according to the invention is constructed on the principle of a double heat exchange. It consists of two chambers separated by one or more perforated horizontal plates. The lower chamber is the storage chamber for hot water produced by the solar energy. The upper chamber receives the surplus calories carried by the water heater by the fluid coming from the solar collector and is equipped with an electrical heating system adapted to add to the water any additional heat required for heating and sanitary purposes.

The surplus energy not used in the storage chamber is transferred by the stratification of heated layers to the top of the heater, any mixture by convection being rendered impossible by anti-convection screens constituted by the perforated plates.

In one embodiment, a supply of heat water for washing purposes may be assured by means of a heat exchanger which is directly introduced into the solar fluid located in an inner skirt at the top of the heater. Any necessary supplemental energy is provided by electricity in such a way that this energy can under no circumstances heat the water stored in the lower chamber.

The hot water outlet is located in the upper chamber and water is returned as a function of the difference in temperature between the temperature of the returning fluid and the temperature of the water in the solar reservoir either into the lower compartment, or into the upper compartment, by an automatic distributor which is electronically controlled.

The following description and the drawings which accompany if describe two embodiments of the heater according to the invention and explain its operation. In these drawings:

FIG. 1 is a schematic diagram of a first heating system embodying the invention; and FIG. 2 is a schematic diagram of a second heating system embodying the invention.

FIG. 1 shows a heater having two chambers D and F separated by a preforated plate X which is a screen against the phenomenon of convection. The outlet toward the radiators R is located at A at the top of the heater. The water returns from the radiators at two points, one located at B in the upper-third of the heater and the other at C at lowest point of the heater.

The water from the solar collectors K circulates through the exchangers S located beneath the perforated plate X and the return duct B in the chamber D.

In the chamber F electrical resistances E are positioned above the perforated plate. A manually adjustable thermostat G mounted in the chamber F or a thermostat responsive to the ambient temperature G located in the appliance to be heated controls the heating of the electrical resistances.

A sensor H is located in the return duct from the radiators upstream of B and a second sensor is located at I at the top of the storage chamber for solar energy. The two sensors are connected to an electronic regulator R4 which controls the movement of the three position valve located at J where the return ducts are connected to each other. Thus, to the extent that the solar reservior suffices to supply sufficient heat, that is to say, so that it is at a temperature equal to or greater than the temperature for which the thermostat G or G' is set, the return from the radiators takes place through C at the bottom of the solar reservoir.

When the temperature of the returning water is equal to or less than that of the solar reservoir, the three position valve J turns and the return water is directed into the chamber F.

It will be appreciated that the term "water" is used to designate the heat-carrying fluids circulating in the radiators, which may be water to which an adequate anti-gelling agent or any other heat-carrying fluid has been added.

It will also be appreciated that, when the installation operates on electrical energy, this in no way interfers with the heating of the solar reservoir, which may continue its accumulation of calories without interruption.

The solar heating circuit comprises the collectors K. The circulation of heat-carrying fluid through the collectors, between the collectors and the storage chamber, and in the heat exchangers within this chamber, is assured by a pump P. This is regulated by an electronic assembly (Q1–Q2–Q3) which does not permit movement of fluid unless the temperature of the fluid circulating through the collector is greater than that of the water in the storage chamber.

The simple difference in density due to the lower temperature of a layer of water beneath the perforated plate as compared to that of a layer of water having a higher temperature above the perforated plate prevents the mixture of these two layers.

On the contrary, once the temperature of the solar reservoir arises, the hot water penetrates into the upper part F, the valve J returns to its initial position, the electrical current through the resistance E is automatically cutoff, and the cycle resumes.

It will thus be appreciated that the operation of this heater is automatic, that the basic energy is solar, and that the supplemental heating is supplied by electrical resistances.

It is possible to combine with the heating system a device for providing hot water for washing purposes which comprises a heat exchanger having fins, for example, positioned in the upper part of the heater, that is to say, in the hottest part.

The system of regulation indicated above is not the only one which could be used, but may be modified to an autonomous and individual system for regulating each radiator by means of a separate theremostat or, to a mixing valve system controlling three or four passages at the outlet of the heater, or to any other regulating system based upon a comparison between the temperature of the fluid in the return system and the temperature of the water in the solar reservoir.

FIG. 2 represents another embodiment of a heater having two chambers D and F separated by several perforated grilles X. This other embodiment makes it possible to avoid the presence of a heat exchanger in the heater. The fluid heated by the solar energy enters the upper part of the heater at M. The outlet for the hot water going to the radiators is located at Y at the top of the heater in the hottest zone, near the inlet for solar fluid. There is practically no difference in temperature between the solar fluid and the fluid supplying the radiators.

Controlling the circuit through the radiators is a regulator Z responsive to the ambient temperature and isolating these radiators once the desired ambient temperature has been attained. The beat-carrying fluid then returns at B without losing its calories. The point of return to the heater is located in the upper part thereof several centimeters beneath the inlet for solor fluid and the outlet for the hot fluid going to the radiators. There is therefore automatic stratification of the hot layers in the upper part of the heater.

Thus, not only is the heat-carrying fluid used at its highest temperature, but storage is also carried out at the highest possible temperature, the mixture and homogenization of the liquid contained in the lower part of the heater D being rendered impossible by the grilles, which prevent the natural and convective movements between two layers of liquids at different temperatures.

The upper chamber is equipped with an inner skirt N made of steel for example, having a height equal to the depth of the exchanger O for the production of clean hot water which is also positioned in the upper part of the heater. The solar fluid entering at a high temperature of M first surrenders its calories to the clean water circulating in the coil O and then distributes them through Y into the radiator. The return fluid returns at B outside the skirt N.

The supplemental energy is introduced by the heating coil E. The heating coil may be replaced by an adequate source of heat, for example for a gas heater, heating a coil, or by a device for directly heating the exterior wall of the heater.

The supplemental supply of heat must meet the essential condition of heating only the heat-carrying fluid used for the radiators without heating the contents of the lower part of the heater. Finally, in view of the substantial capacity of the heater, an annular bladder V is positioned between the two grilles. This bladder is inflated by means of a neutral gas which ensures compensation for the dilations of the liquid without requiring a special device to be inserted in the circuit.

What is claimed is:

1. In the combination of a solar heater, a storage container connected to receive heated liquid from and supply cooler liquid to said solar heater, and heat utilizing means connected to receive heated liquid from said storage container and return a cooler liquid to said container, the improvement which comprises:
    at least one perforated partition dividing said container into upper and lower chambers,
    an inlet for heated liquid from said solar heater,
    an outlet for said heated liquid supplying said heat utilizing means, and an inlet for cooler liquid from said heat utilizing means, both said inlets and said outlets being located in said upper chamber, with the inlet for cooler liquid from said heat utilizing means below said outlets,
    an outlet supplying cooler liquid to said solar heater positioned near the bottom of said upper chamber,
    additional heating means in said upper chamber, and
    heat responsive means for activating said additional heatng means.

2. Apparatus as claimed in claim 1, in which convective movement between the layers of liquid in said two chambers is prevented by said horizontal perforated partition, which extends diametrically across the container.

3. Apparatus as claimed in claim 1, comprising a heat exchanger supplies with clean hot water directly immersed in the upper chamber and located inside a skirt at the top of the upper chambers.

4. Heater as claimed in claim 1 having a skirt depending from the top of its upper chamber, said inlet for liquid heated by said solar heater leading into said upper chamber inside said skirt, and a heat exchanger coil inside said skirt through which clean water from outside said container circulates.

5. Apparatus as claimed in claim 1 in which said additional heating means is an electrical heater and said heat responsive means is responsive to the ambient temperature and adapted to initiate electrical heating when said ambient temperature falls below a predetermined temperature.

* * * * *

UNITED STATES PATENT OFFICE
CERTIFICATE OF CORRECTION

PATENT NO. : 4,037,785
DATED : July 26, 1977
INVENTOR(S) : Jean-Pierre Madern

It is certified that error appears in the above-identified patent and that said Letters Patent are hereby corrected as shown below:

[30]     Foreign Application Priority Data
    Aug. 20, 1974     France..................74.28916
    Feb. 3, 1975      France..................75.03789

Signed and Sealed this

*Twenty-seventh* Day of *December 1977*

[SEAL]

Attest:

RUTH C. MASON
*Attesting Officer*

LUTRELLE F. PARKER
*Acting Commissioner of Patents and Trademarks*